(12) United States Patent
Chen et al.

(10) Patent No.: US 10,423,706 B2
(45) Date of Patent: Sep. 24, 2019

(54) METHOD AND DEVICE FOR SELECTING INFORMATION

(71) Applicant: Xiaomi Inc., Beijing (CN)

(72) Inventors: Zhijun Chen, Beijing (CN); Qiuping Qin, Beijing (CN); Song Yang, Beijing (CN)

(73) Assignee: XIAOMI INC., Beijing (CN)

( * ) Notice: Subject to any disclaimer, the term of this patent is extended or adjusted under 35 U.S.C. 154(b) by 962 days.

(21) Appl. No.: 14/799,592

(22) Filed: Jul. 15, 2015

(65) Prior Publication Data

US 2016/0124921 A1 May 5, 2016

Related U.S. Application Data

(63) Continuation of application No. PCT/CN2015/074628, filed on Mar. 19, 2015.

(30) Foreign Application Priority Data

Oct. 31, 2014 (CN) .......................... 2014 1 0601591

(51) Int. Cl.
*G06F 17/00* (2019.01)
*G06F 17/22* (2006.01)
*G06F 17/24* (2006.01)
*G06F 3/0488* (2013.01)
*G06F 3/0484* (2013.01)

(52) U.S. Cl.
CPC ...... *G06F 17/2247* (2013.01); *G06F 3/04842* (2013.01); *G06F 3/04883* (2013.01); *G06F 17/2229* (2013.01); *G06F 17/24* (2013.01)

(58) Field of Classification Search
CPC .................................................. G06F 17/2247
See application file for complete search history.

(56) References Cited

U.S. PATENT DOCUMENTS

| 7,610,564 | B1 | 10/2009 | Pfohe et al. |
| 7,912,829 | B1 | 3/2011 | Mathes et al. |
| 8,984,390 | B2 * | 3/2015 | Aymeloglu ......... G06F 17/2288 715/207 |

(Continued)

FOREIGN PATENT DOCUMENTS

| CN | 101930448 A | 12/2010 |
| CN | 102314448 A | 1/2012 |

(Continued)

OTHER PUBLICATIONS

Carol Bratt,"Extend Selection Mode: MS Word", published on Sep. 6, 2006, XP055255856, Retrieved from the Internet: URL: https://www.infopackets.com/news/1548/extend-selection-mode-ms-word, Retrieved on Mar. 7, 2016; p. 1-p. 2.

*Primary Examiner* — Mustafa A Amin
(74) *Attorney, Agent, or Firm* — Jun He Law Offices P.C.; James J. Zhu (57) ABSTRACT

The present disclosure relates to a method and a device for selecting information. The method includes: receiving a user operation for selecting information from page content, wherein the page content is divided into at least one content block; selecting a content block corresponding to the user operation from the at least one content block; and determining information of the selected content block as selected information.

10 Claims, 9 Drawing Sheets

(56) References Cited

U.S. PATENT DOCUMENTS

| | | | |
|---|---|---|---|
| 2003/0185448 A1* | 10/2003 | Seeger | G06K 9/2054 |
| | | | 382/229 |
| 2006/0132455 A1 | 6/2006 | Rimas-Ribikauskas et al. | |
| 2008/0168388 A1 | 7/2008 | Decker | |
| 2009/0177959 A1* | 7/2009 | Chakrabarti | G06F 17/2229 |
| | | | 715/234 |
| 2009/0228842 A1 | 9/2009 | Westerman et al. | |
| 2014/0282242 A1* | 9/2014 | Denoue | G06F 17/277 |
| | | | 715/810 |
| 2014/0325350 A1 | 10/2014 | Okamoto | |
| 2015/0186005 A1* | 7/2015 | Roper | G06F 3/0488 |
| | | | 715/765 |

FOREIGN PATENT DOCUMENTS

| | | |
|---|---|---|
| CN | 104123074 A | 10/2014 |
| JP | H09101991 A | 4/1997 |
| JP | 2004265403 A | 9/2004 |
| JP | 2008305163 A | 12/2008 |
| JP | 2012018674 A | 1/2012 |
| JP | 2012027724 A | 2/2012 |
| JP | 2012514792 A | 6/2012 |
| JP | 2013030089 A | 2/2013 |
| JP | 2014052744 A | 3/2014 |
| JP | 2014142911 A | 8/2014 |

\* cited by examiner

METHOD AND DEVICE FOR SELECTING INFORMATION

CROSS-REFERENCE TO RELATED APPLICATIONS

This application is a Continuation application of International Application No. PCT/CN2015/074628, filed with the State Intellectual Property Office of P. R. China on Mar. 19, 2015, which is based on and claims priority to Chinese Patent Application No. 201410601591.8, filed on Oct. 31, 2014, the entire contents of which are incorporated herein by reference.

TECHNICAL FIELD

The present disclosure generally relates to the field of touch screen operation, and more particularly, to a method and a device for selecting information.

BACKGROUND

When using a touch screen terminal device to browse a webpage or a text, a user may select a portion of text information for copying or searching.

When needing to select the text information on the webpage, the user may perform a long-press operation on the webpage. When detecting the long-press operation of the user, the touch screen terminal device displays a text selection component including a front select box and a rear select box. The user selects text information between the front select box and the rear select box by dragging the front select box and/or the rear select box.

SUMMARY

According to a first aspect of embodiments of the present disclosure, there is provided a method for selecting information, including: receiving a user operation for selecting information from page content, wherein the page content is divided into at least one content block; selecting a content block corresponding to the user operation from the at least one content block; and determining information of the selected content block as selected information.

According to a second aspect of embodiments of the present disclosure, there is provided a device for selecting information, including: a processor; and a memory for storing instructions executable by the processor, wherein the processor is configured to perform: receiving a user operation for selecting information from page content, wherein the page content is divided into at least one content block; selecting a content block corresponding to the user operation from the at least one content block; and determining information of the selected content block as selected information.

According to a third aspect of embodiments of the present disclosure, there is provided a non-transitory computer-readable storage medium having stored therein instructions that, when executed by a processor of a device, causes the device to perform a method for selecting information. The method includes: receiving a user operation for selecting information from page content, wherein the page content is divided into at least one content block; selecting a content block corresponding to the user operation from the at least one content block; and determining information of the selected content block as selected information.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

The method for selecting information according to exemplary embodiments of the present disclosure may be implemented by a device, such as a touch screen terminal device. The touch screen terminal device may be a smart phone, a tablet PC (personal computer), an e-book reader, a MP3 (Moving Picture Experts Group Audio Layer III) player, a MP4 (Moving Picture Experts Group Audio Layer IV) player, a portable laptop computer, a camera, a video camera, and etc.

Figure 1:
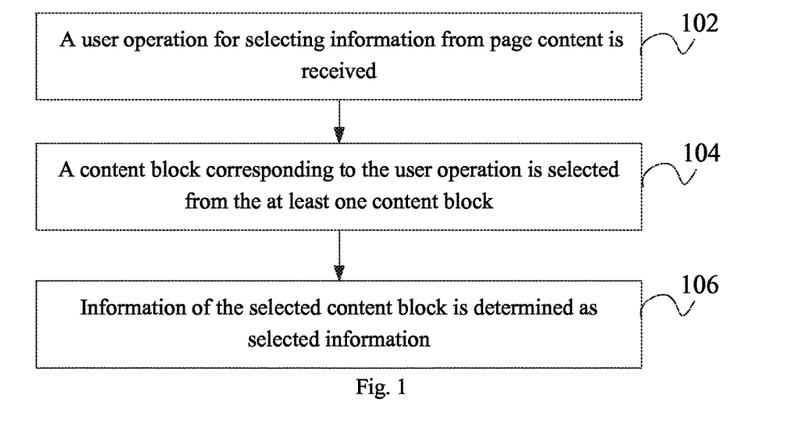
FIG. 1 is a flow chart of a method for selecting information according to an exemplary embodiment of the present disclosure.

FIG. 1 is a flow chart of a method for selecting information according to an exemplary embodiment. In this embodiment, the use of the method for selecting information in a touch screen terminal device is illustrated. The method for selecting information may include the following steps.

In step 102, a user operation for selecting information from page content is received. In this embodiment, page content is displayed on the touch screen of the terminal device and consists of at least one content block. The user operation acted on the touch screen is received through the touch screen. The user operation is selected from the group consisting of a touch, a swipe, a gesture, and any combination thereof. Moreover, in the exemplary embodiment, the user operation is used to select text information from the page content.

In step 104, a content block corresponding to the user operation is selected from the at least one content block. In this step, the terminal device decides and selects a content block according to the user operation.

In step 106, information of the selected content block is determined as selected information.

In conclusion, through the method for selecting information according to the present exemplary embodiment, the user operation for selecting information from page content is received, the content block corresponding to the user operation is selected from the at least one content block, and the information of the selected content block is determined as selected information. Therefore it is possible to solve the problem that a lot of operations are wasted to select desired text information since it is difficult for a user to accurately drag a front select box and/or a rear select box, that is the accuracy when selecting text information is low due to a small screen of a touch screen terminal device. Therefore, it is possible to achieve the effect of accurately identifying the content block selected by the user and enhancing the accuracy of selecting text information.

In an exemplary implementation process, the user performs the user operation on a page in which the page content is a text, the touch screen terminal device has divided the text according to a paragraph structure and a sentence structure of the text so as to obtain at least one content block organized into a tree structure, thus determining the content block selected by the user operation of the user. An exemplary embodiment will be illustrated below.

Figure 2A:
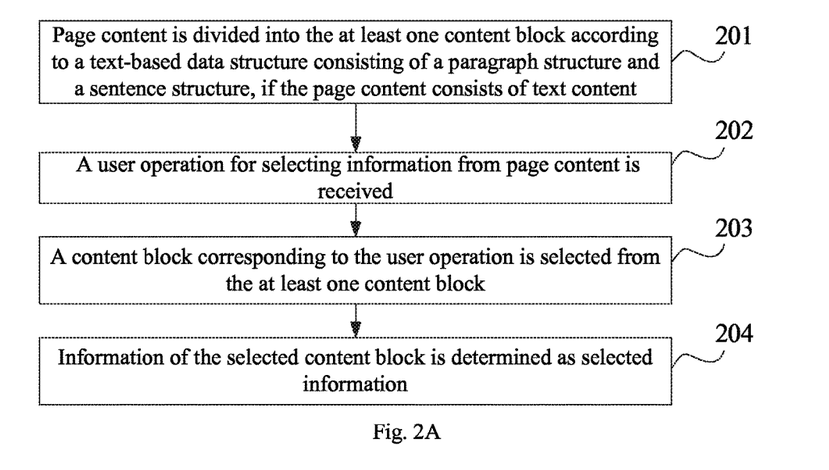
FIG. 2A is a flow chart of a method for selecting information according to another exemplary embodiment of the present disclosure.

FIG. 2A is a flow chart of a method for selecting information according to another exemplary embodiment. In this embodiment, the use of the method for selecting information in a touch screen terminal device will be illustrated. The method for selecting information may include the following steps.

In step 201, the page content is divided into the at least one content block according to a text-based data structure consisting of a paragraph structure and a sentence structure, if the page content consists of text content.

The touch screen terminal device may identify the page content currently displayed to determine a page content type. In general the page content type includes text content and webpage content, and etc. For example, if it is identified that there are continuous words in the page, it may be determined that the page content belongs to text content.

If it is determined that the current page content consists of text content, the touch screen terminal device may divide the text content according to the text-based data structure consisting of the paragraph structure and the sentence structure. This step may include the following substeps A to C.

In substep A, the text content is taken as a root content block.

The touch screen terminal device uses the text content as the root content block organized into the tree structure.

Figure 2B:
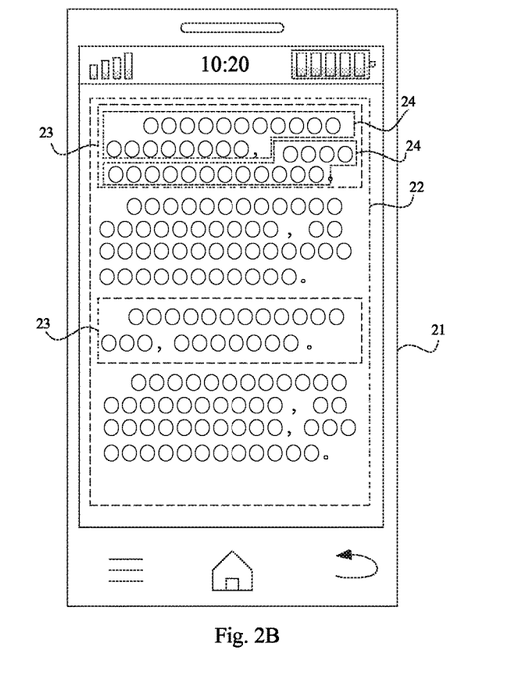
FIG. 2B is a schematic diagram of an interface involved in a method for selecting information according to another exemplary embodiment of the present disclosure.

As shown in FIG. 2B, a touch screen terminal device 21 identifies that current page content consists of text content 22, and uses the text content 22 as the corresponding root content block organized into the tree structure.

In substep B, the text content is divided according to the paragraph structure to obtain at least one second-level content block, in which each of the at least one second-level content block corresponds to one paragraph.

The touch screen terminal device may divide the text content into different paragraphs according to line breaks in the text content, and uses each paragraph as one second-level content block.

For example, as shown in FIG. 2B, the touch screen terminal device 21 uses each paragraph 23 in the text content 22 as the corresponding second-level content block organized into the tree structure.

In substep C, each of the at least one second-level content block is divided according to the sentence structure to obtain at least one third-level content block, in which each of the at least one third-level content block corresponds to one sentence.

After obtaining the second-level content block, the touch screen terminal device divides each second-level content block according to the sentence structure in accordance with punctuation, i.e. the touch screen terminal device may divide each paragraph into different sentences according to punctuations, and uses each sentence as the third-level content block organized into the tree structure. The punctuation may be a comma, a semicolon, a period, or the like.

For example, as shown in FIG. 2B, the touch screen terminal device 21 divides each paragraph 23 into different sentences 24 according to punctuations, and uses each sentence 24 as a third-level content block.

Figure 2C:
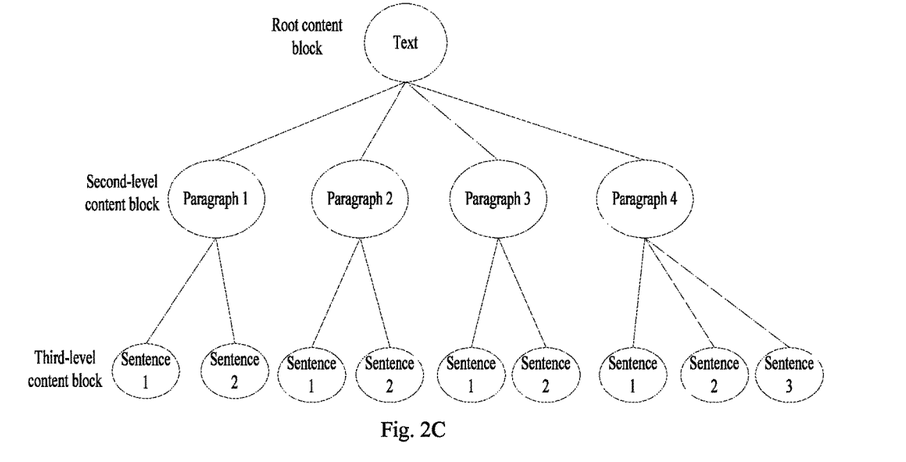
FIG. 2C is an implementation diagram of a method for selecting information according to another exemplary embodiment of the present disclosure.

After the touch screen terminal device divides the text content according to the paragraph structure and the sentence structure of the text content, it is possible to obtain the tree structure as shown in FIG. 2C.

Alternatively, since the user usually searches for or copies a certain word, after obtaining a three-level tree structure, the touch screen terminal device may further divide each third-level content block according to the word so as to obtain at least one fourth-level content block, in which each fourth-level content block corresponds to one word.

In step 202, a user operation for selecting information from page content is received.

In this embodiment, page content is displayed on the touch screen of the terminal device and consists of at least one content block. The touch screen terminal device receives the user operation acted on the touch screen from the user. The user operation may be a gesture of drawing a circle, a gesture of drawing a horizontal line, a gesture of drawing a vertical line, or the like. The user operation may be an action predetermined by the touch screen terminal device, and may also be set by the user. The touch screen terminal device determines a corresponding operation region according to the user operation. Moreover, in the exemplary embodiment, the user operation is used to select text information from the page content.

Figure 2D:
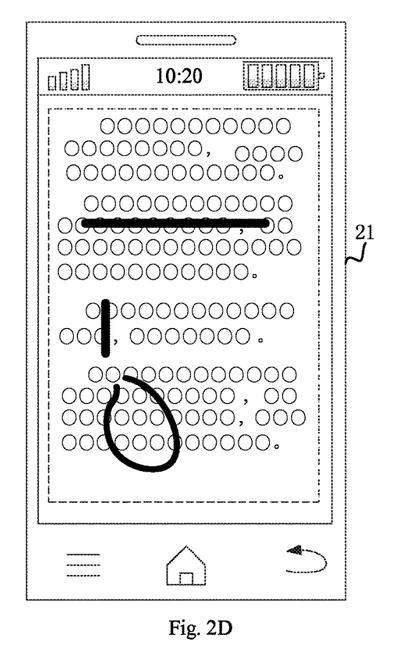
FIG. 2D is a schematic diagram of an interface involved in a method for selecting information according to another exemplary embodiment of the present disclosure.

As an example, as shown in FIG. 2D, if the user draws a horizontal line on the touch screen terminal device 21, the touch screen terminal device 21 determines a region crossed by the horizontal line as the operation region. As another example, if the user draws a circle on the touch screen terminal device 21, the touch screen terminal device 21 determines a region enclosed by the circle as the operation region. As yet another example, if the user draws a vertical line on the touch screen terminal device 21, the touch screen terminal device 21 determines a region crossed by the vertical line as the operation region.

It should be noted that step 201 may be performed after step 202, and in this embodiment, the order of step 201 and step 202 is not limited.

In step 203, a content block corresponding to the user operation is selected from the at least one content block.

The touch screen terminal device determines and selects the content block according to the operation region of the user operation. This step may include the following three possible implementations.

In a first possible implementation, all of one content block is determined as the selected content block if an operation region of the user operation covers all or a part of the one content block.

Figure 2E:
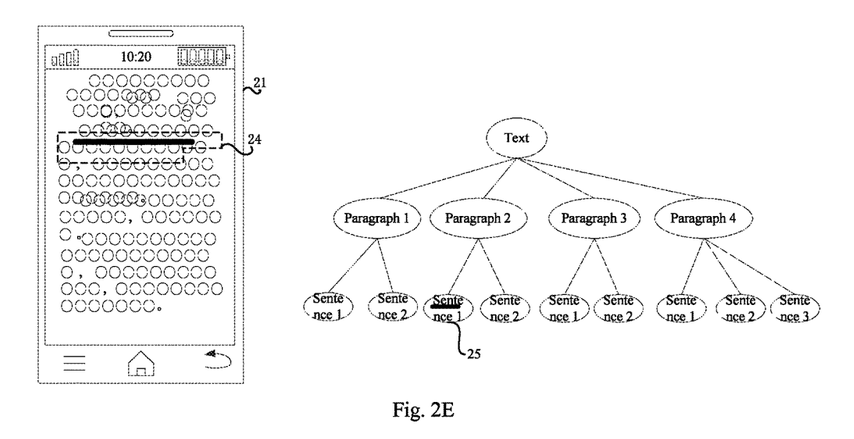
FIG. 2E is an implementation diagram of a method for selecting information according to another exemplary embodiment of the present disclosure.

For example, as shown in FIG. 2E, if the user selects text information by drawing a horizontal line on the touch screen terminal device 21, and an operation region corresponding to the horizontal line covers a part of a sentence 24, i.e. covers a part of a third-level content block 25 corresponding to the sentence 24, then the touch screen terminal device 21 determines all of the third-level content block 25 as the selected content block.

In a second possible implementation, two content blocks connected by punctuation are determined as the selected content block if the operation region of the user operation covers the punctuation between the two content blocks.

Figure 2F:
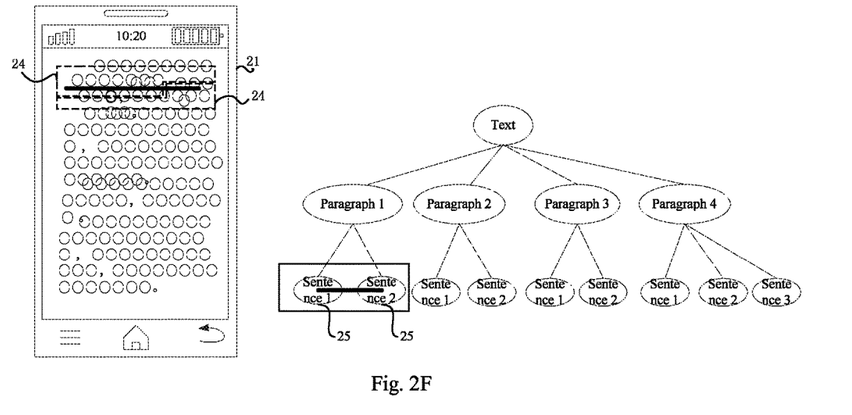
FIG. 2F is an implementation diagram of a method for selecting information according to another exemplary embodiment of the present disclosure.

For example, as shown in FIG. 2F, if the user selects text information by drawing a horizontal line on the touch screen terminal device 21, and the operation region corresponding to the horizontal line covers a comma between two sentences 24, i.e. covers punctuation between two third-level content blocks 25, then the touch screen terminal device 21 determines the two third-level content blocks 25 as the content block selected by the horizontal line.

In a third possible implementation, an upper-level content block is determined as the content block selected by the user operation if the operation region of the user operation covers a first lower-level content block and a last lower-level content block of the upper-level content block.

Figure 2G:
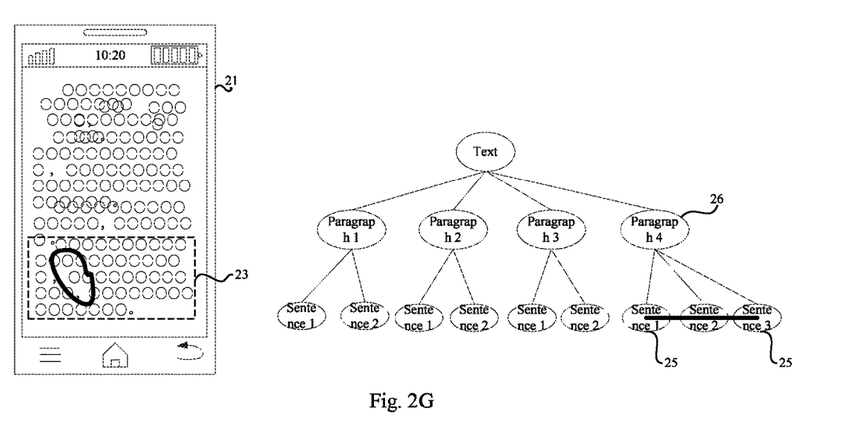
FIG. 2G is an implementation diagram of a method for selecting information according to another exemplary embodiment of the present disclosure.

For example, as shown in FIG. 2G, if the user selects text information by drawing a circle on the touch screen terminal device 21, and an operation region corresponding to the circle covers a first sentence and a last sentence of a paragraph 23, i.e. covers a first third-level content block 25 to a last third-level content block 25 of the same second-level content block 26, then the touch screen terminal device 21 determines the second-level content block 26 corresponding to the paragraph 23 as the selected content block.

In step 204, information of the selected content block is determined as selected information.

The touch screen terminal device acquires text information corresponding to the content block, determines the text information as the selected information, and marks the selected information. For example, the selected information may be selected via a dashed-line box or a solid-line box, or the background color of the selected information may be changed.

For example, as shown in FIG. 2G, the touch screen terminal device determines the second-level content block 26 as the selected content block, acquires the paragraph 23 corresponding to the second-level content block 26, uses the paragraph 23 as the selected information, and selects the paragraph 23 using a dashed-line box.

After determining the selected information, the touch screen terminal device displays an operation menu, and the user performs a corresponding operation on the selected information by selecting an operation option in the operation menu. It should be noted that the user may also call the operation menu by clicking a virtual button or a physical button on the touch screen terminal device.

Figure 2H:
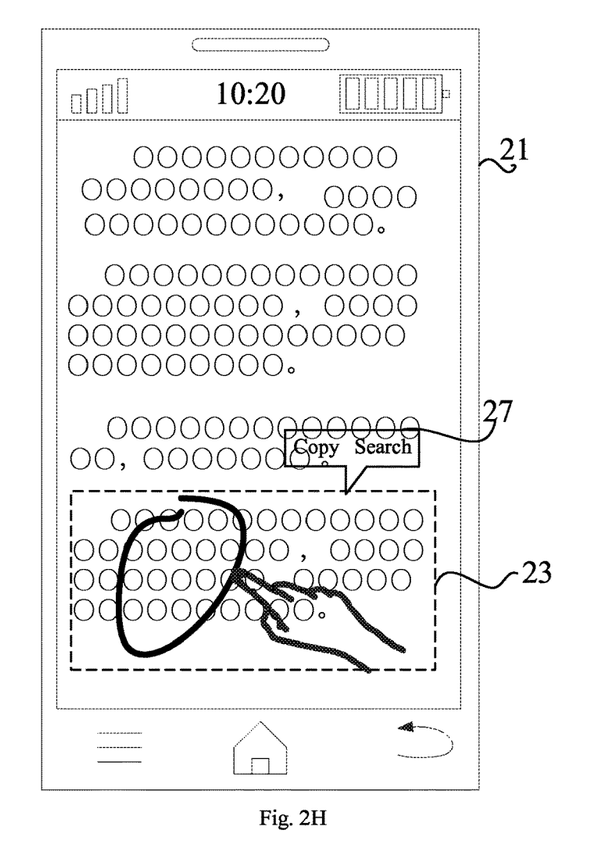
FIG. 2H is an interface diagram of a method for selecting information according to another exemplary embodiment of the present disclosure.

As shown in FIG. 2H, the touch screen terminal device 21 determines the paragraph 23 as the selected information according to the selected content block, and displays an operation menu 27, and the user may copy the selected information by selecting a "copy" option in the operation menu 27, or may search for the selected information by selecting a "search" option in the operation menu 27.

In conclusion, through the method for selecting information according to the present exemplary embodiment, it is possible to solve the problem that a lot of operations are wasted to select desired text information since it is difficult for a user to accurately drag a front select box and/or a rear select box, that is the accuracy when selecting text information is low due to a small screen of a touch screen terminal device. Therefore, it is possible to achieve the effect of accurately identifying the content block selected by the user and enhancing the accuracy of selecting text information.

In this exemplary embodiment, if the page content consists of text content, the touch screen terminal device may divide the text according to the paragraph structure and the sentence structure to obtain at least one content block organized into the tree structure, so as to determine the content block selected by the user operation, thus enhancing the selection accuracy of the user and simplifying the user operation of the user.

In another exemplary implementation process, the user performs the user operation on a page in which the page content consists of webpage content, then the touch screen terminal device divides the webpage content according to a webpage-based data structure so as to obtain at least one content block organized into a tree structure, thus determining the selected content block. An exemplary embodiment will be illustrated below.

Figure 3A:
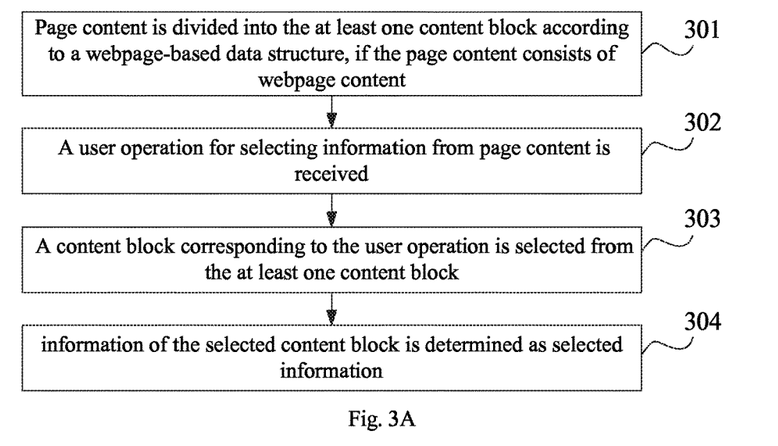
FIG. 3A is a flow chart of a method for selecting information according to yet another exemplary embodiment of the present disclosure.

FIG. 3A is a flow chart of a method for selecting information according to another exemplary embodiment. In this embodiment, the use of the method for selecting information in a touch screen terminal device will be illustrated. The method for selecting information may include the following steps.

In step 301, the page content is divided into the at least one content block according to a webpage-based data structure, if the page content consists of webpage content.

The touch screen terminal device may identify the displayed page content to determine a page content type. In general, the page content type includes text content and webpage content, and etc. For example, if the touch screen terminal device identifies that words in the page content are discontinuous and the page contains a picture or a cartoon, it may be determined that the type of the page content belongs to webpage content. Alternatively, if the touch screen terminal device identifies a web address displayed at a top bar of the page content, it may be determined that the type of the page content belongs to webpage content.

If it is determined that the current page content belongs to webpage content, the touch screen terminal device may divide the webpage content according to the structure of the webpage. This step may include the following substeps D to E.

In substep D, the touch screen terminal device analyzes the tree structure of the webpage content according to a source code of the webpage content.

Since most webpages have the tree structure, the touch screen terminal device may analyze the tree structure according to the source code of the webpage content.

For example, when the user leaves a message on the webpage content, each message corresponds to one DIV (division) in the source code of the webpage content, and each DIV corresponds to one branch of the tree structure of the webpage content. The touch screen terminal device may obtain the tree structure of the webpage content by analyzing the DIV in the source code of the webpage content.

In substep E, the touch screen terminal device divides the webpage content according to the tree structure so as to obtain at least one content block organized into the tree structure.

The touch screen terminal device may make each DIV correspond to one content block according to the tree structure, so as to obtain at least one content block organized into the tree structure.

Figure 3B:
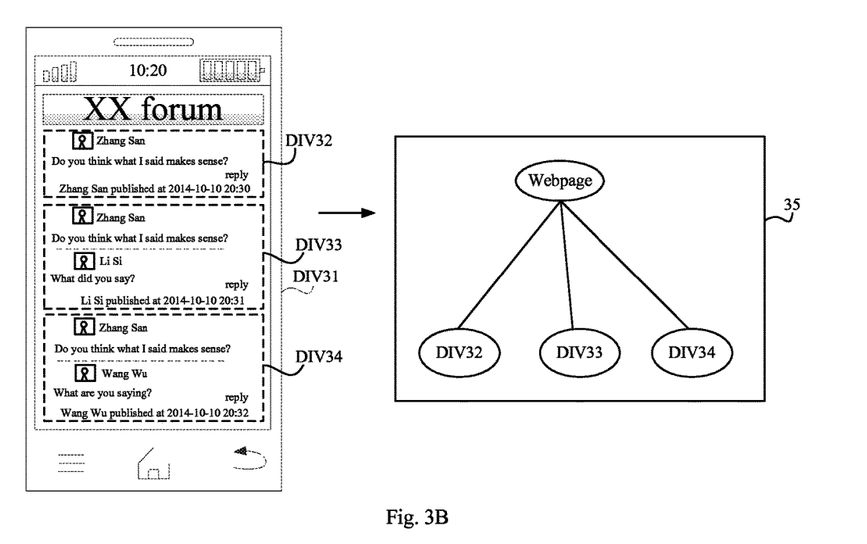
FIG. 3B is an implementation diagram of a method for selecting information according to yet another exemplary embodiment of the present disclosure.

As shown in FIG. 3B, a touch screen terminal device 31 analyzes the source code of the webpage content to obtain DIV 32, DIV 33 and DIV 34, and each DIV corresponds to one content block, so as to obtain a tree structure 35.

In step 302, a user operation for selecting information from page content is received. Herein the page content is divided into at least one content block.

This step is similar to step 202, i.e. the user operation of the user such as a gesture of drawing a circle, a gesture of drawing a horizontal line, or a gesture of drawing a vertical line is received, and an operation region corresponding to the user operation is determined.

It should be noted that step 301 may be performed after step 302, and in this embodiment, the order of step 301 and step 302 is not limited.

In step 303, a content block corresponding to the user operation is selected from the at least one content block.

If the operation region of the user operation covers all or a part of one content block, the touch screen terminal device determines all of the one content block as the content block selected by the user operation.

Figure 3C:
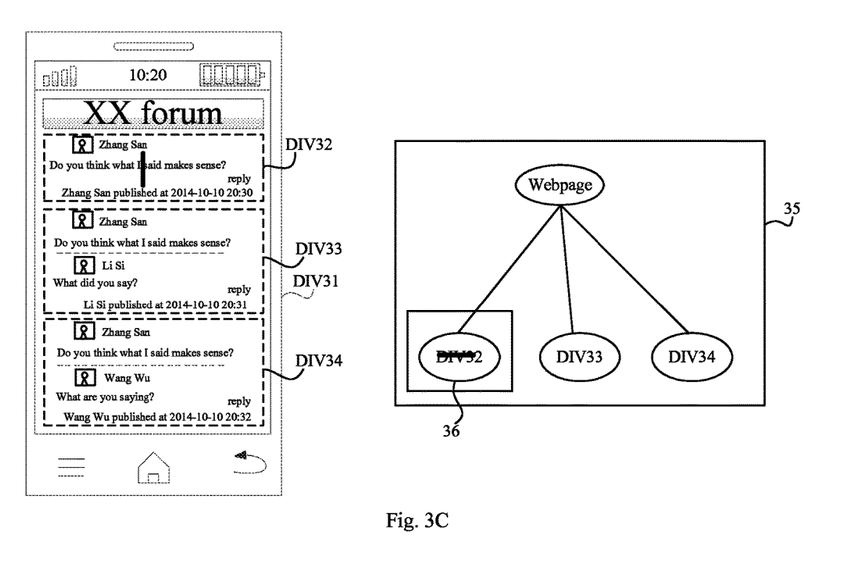
FIG. 3C is an implementation diagram of a method for selecting information according to yet another exemplary embodiment of the present disclosure.

For example, as shown in FIG. 3C, if the user selects a comment content by drawing a vertical line on the touch screen terminal device 31, and an operation region corresponding to the vertical line covers a part of DIV 32, i.e. covers a part of a content block 36 corresponding to DIV 32, then the touch screen terminal device 31 determines all of the content block 36 as the content block selected by the vertical line.

If the operation region of the user operation covers all or a part of multiple content blocks, the touch screen terminal device determines all of the multiple content blocks as the content block selected by the user operation.

Figure 3D:
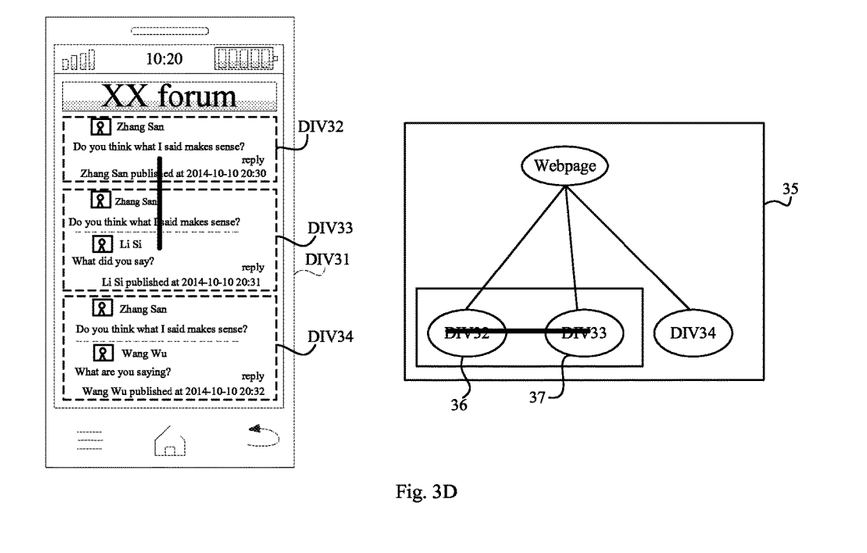
FIG. 3D is an implementation diagram of a method for selecting information according to yet another exemplary embodiment of the present disclosure.

For example, as shown in FIG. 3D, if the user selects the comment content by drawing a vertical line on the touch screen terminal device 31, and an operation region corresponding to the vertical line covers a part of DIV 32 and DIV 33, i.e. covers a part of the content block 36 corresponding to DIV 32 and a content block 37 corresponding to DIV 33, then the touch screen terminal device 31 determines all of the content block 36 and the content block 37 as the content block selected by the vertical line.

In step 304, information of the selected content block is determined as selected information.

This step is similar to step 204, which will not be elaborated herein.

In conclusion, through the method for selecting information according to the present exemplary embodiment, it is possible to solve the problem that a lot of operations are wasted to select desired text information since it is difficult for a user to accurately drag a front select box and/or a rear select box, that is the accuracy when selecting text information is low due to a small screen of a touch screen terminal device. Therefore, it is possible to achieve the effect of accurately identifying the content block selected by the user and enhancing the accuracy of selecting text information.

In this exemplary embodiment, if the page content consists of webpage content, the touch screen terminal device may divide the webpage content according to the structure of the webpage content to obtain at least one content block organized into the tree structure, so as to determine the content block selected by the user operation, thus enhancing the selection accuracy of the user and simplifying the user operation of the user.

The following apparatus embodiments of the present disclosure may be used to perform the method embodiments of the present disclosure. Concerning details not disclosed in the apparatus embodiments of the present disclosure, reference is made to the method embodiments of the present disclosure.

Figure 4:
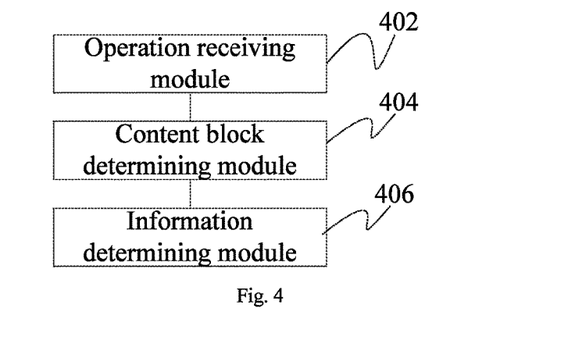
FIG. 4 is a block diagram of an apparatus for processing information according to an exemplary embodiment of the present disclosure.

FIG. 4 is a block diagram of an apparatus for selecting information according to an exemplary embodiment. The apparatus for selecting information may become a part or all of a touch screen terminal device via software, hardware, or a combination of both software and hardware. The apparatus for selecting information may include an operation receiving module 402, a content block determining module 404, and an information determining module 406.

The operation receiving module 402 is configured to receive a user operation for selecting information from page content, wherein the page content is divided into at least one content block.

The content block determining module 404 is configured to select a content block corresponding to the user operation from the at least one content block.

The information determining module 406 is configured to determine information of the selected content block as selected information.

In conclusion, through the apparatus for selecting information according to the present exemplary embodiment, it is possible to solve the problem that a lot of operations are wasted to select desired text information since it is difficult for a user to accurately drag a front select box and/or a rear select box, that is the accuracy when selecting text information is low due to a small screen of a touch screen terminal device. Therefore, it is possible to achieve the effect of accurately identifying the content block selected by the user and enhancing the accuracy of selecting text information.

Figure 5:
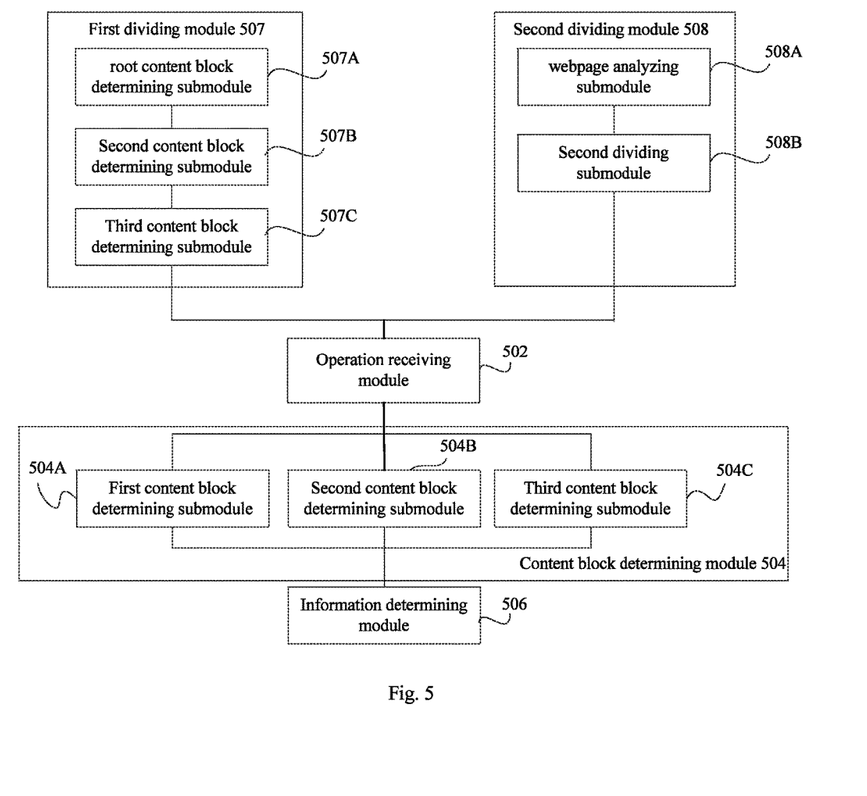
FIG. 5 is a block diagram of an apparatus for processing information according to another exemplary embodiment of the present disclosure.

FIG. 5 is a block diagram of an apparatus for selecting information according to another exemplary embodiment. The apparatus for selecting information may become a part or all of a touch screen terminal device via software, hardware, or a combination thereof. The apparatus for selecting information may include an operation receiving module 502, a content block determining module 504, and an information determining module 506.

The operation receiving module 502 is configured to receive a user operation for selecting information from page content, wherein the page content is divided into at least one content block.

The content block determining module 504 is configured to select a content block corresponding to the user operation from the at least one content block.

The information determining module 506 is configured to determine information of the selected content block as selected information.

Alternatively, the apparatus further includes a first dividing module 507 or a second dividing module 508.

The first dividing module 507 is configured to divide the page content into the at least one content block according to a text-based data structure consisting of a paragraph structure and a sentence structure, if the page content consists of text content.

The second dividing module 508 is configured to divide the page content into the at least one content block according to a webpage-based data structure, if the page content consists of webpage content.

Alternatively, the first dividing module 507 includes: a root content block determining submodule 507A configured to take the text content as a root content block; a second content block determining submodule 507B configured to divide the text content according to the paragraph structure to obtain at least one second-level content block, wherein each of the at least one second-level content block corresponds to one paragraph; a third content block determining submodule 507C configured to divide each of the at least one second-level content block according to the sentence structure to obtain at least one third-level content block, wherein each of the at least one third-level content block corresponds to one sentence.

Alternatively, the second dividing module 508 includes: a webpage analyzing submodule 508A configured to analyze a tree structure of the webpage according to a source code of the webpage; a second dividing submodule 508B configured to divide the webpage according to the tree structure so as to obtain at least one content block organized into a tree structure.

Alternatively, the content block determining module 504 includes: a first content block determining submodule 504A configured to determine all of one content block as the content block selected by the user operation if an operation region of the user operation covers all or a part of the one content block; or a second content block determining submodule 504B configured to determine two content blocks connected by punctuation as the content block selected by the user operation if an operation region of the user operation covers the punctuation between the two content blocks; or a third content block determining submodule 504C configured to determine an upper-level content block as the content block selected by the user operation if an operation region of the user operation covers a first lower-level content block and a last lower-level content block of the upper-level content block.

In conclusion, through the apparatus for selecting information according to the present exemplary embodiment, it is possible to solve the problem that a lot of operations are wasted to select desired text information since it is difficult for a user to accurately drag a front select box and/or a rear select box, that is the accuracy when selecting text information is low due to a small screen of a touch screen terminal device. Therefore, it is possible to achieve the effect of accurately identifying the content block selected by the user and enhancing the accuracy of selecting text information.

Figure 6:
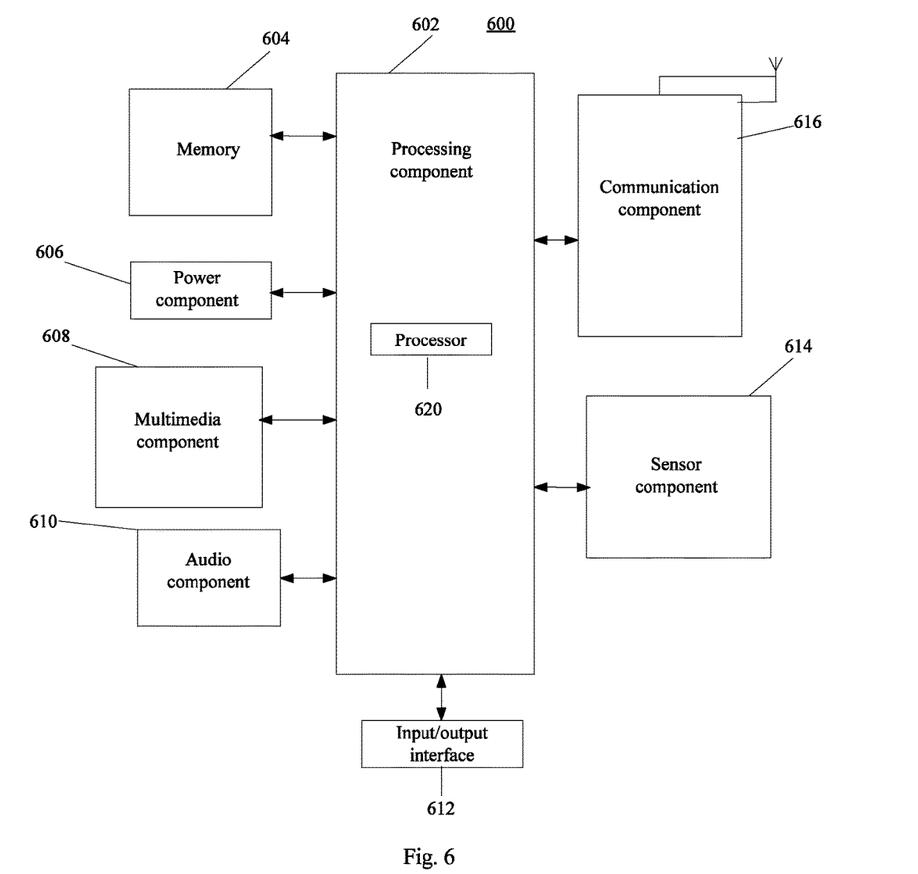
FIG. 6 is a block diagram of a touch screen terminal device according to an exemplary embodiment of the present disclosure.

FIG. 6 is a block diagram of a device 600 for selecting information according to an exemplary embodiment. For example, the device 600 may be a touch screen terminal device, or the like.

Referring to FIG. 6, the device 600 may include one or more of the following components: a processing component 602, a memory 604, a power component 606, a multimedia component 608, an audio component 610, an input/output (I/O) interface 612, a sensor component 614, and a communication component 616.

The processing component 602 typically controls overall operations of the device 600, such as the operations associated with display, telephone calls, data communications, camera operations, and recording operations. The processing component 602 may include one or more processors 620 to execute instructions to perform all or part of the steps in the above described methods. Moreover, the processing component 602 may include one or more modules which facilitate the interaction between the processing component 602 and other components. For instance, the processing component 602 may include a multimedia module to facilitate the interaction between the multimedia component 608 and the processing component 602.

The memory 604 is configured to store various types of data to support the operation of the device 600. Examples of such data include instructions for any applications or methods operated on the device 600, contact data, phonebook data, messages, pictures, video, etc. The memory 604 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 606 provides power to various components of the device 600. The power component 606 may include a power management system, one or more power sources, and any other components associated with the generation, management, and distribution of power in the device 600.

The multimedia component 608 includes a screen providing an output interface between the device 600 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 608 includes a front camera and/or a rear camera. The front camera and the rear camera may receive an external multimedia datum while the device 600 is in an operation mode, such as a photographing mode or a video mode. Each of the front camera and the rear camera may be a fixed optical lens system or have focus and optical zoom capability.

The audio component 610 is configured to output and/or input audio signals. For example, the audio component 610 includes a microphone (MIC) configured to receive an external audio signal when the device 600 is in an operation mode, such as a call mode, a recording mode, and a voice recognition mode. The received audio signal may be further stored in the memory 604 or transmitted via the communication component 616. In some embodiments, the audio component 610 further includes a speaker to output audio signals.

The I/O interface 612 provides an interface between the processing component 602 and peripheral interface modules, such as a keyboard, a click wheel, buttons, and the like. The buttons may include, but are not limited to, a home button, a volume button, a starting button, and a locking button.

The sensor component 614 includes one or more sensors to provide status assessments of various aspects of the device 600. For instance, the sensor component 614 may detect an open/closed status of the device 600, relative positioning of components, e.g., the display and the keypad, of the device 600, a change in position of the device 600 or a component of the device 600, a presence or absence of user contact with the device 600, an orientation or an acceleration/deceleration of the device 600, and a change in temperature of the device 600. The sensor component 614 may include a proximity sensor configured to detect the presence of nearby objects without any physical contact. The sensor component 614 may also include a light sensor, such as a CMOS or CCD image sensor, for use in imaging applications. In some embodiments, the sensor component 614 may also include an accelerometer sensor, a gyroscope sensor, a magnetic sensor, a pressure sensor, or a temperature sensor.

The communication component 616 is configured to facilitate communication, wired or wirelessly, between the device 600 and other devices. The device 600 can access a wireless network based on a communication standard, such as WiFi, 2G, or 3G, or a combination thereof. In one exemplary embodiment, the communication component 616 receives a broadcast signal or broadcast associated information from an external broadcast management system via a broadcast channel. In one exemplary embodiment, the communication component 616 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 600 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 604, executable by the processor 620 in the device 600, for performing the above-described methods. For example, the non-transitory computer-readable storage medium may be a ROM, a RAM, a CD-ROM, a magnetic tape, a floppy disc, an optical data storage device, and the like.

A non-transitory computer-readable storage medium is provided. When instructions in the storage medium are executed by a processor of the device 600, the device 600 may perform a method for selecting information applied to an electronic device having a touch screen function.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for selecting information, applied to a terminal device, comprising:
   receiving, through a touch screen of the terminal device, a user operation for selecting information from page content, wherein the page content is divided into at least one content block;
   selecting a content block corresponding to the user operation from the at least one content block, wherein selecting the content block corresponding to the user operation from the at least one content block comprises: determining two content blocks connected by punctuation as the selected content block based on that an operation region of the user operation covers the punctuation between the two content blocks, and determining an upper-level content block as the selected content block based on that the operation region of the user operation covers both a first lower-level content block and a last lower-level content block of the upper-level content block; and
   determining information of the selected content block as selected information;
   wherein the page content is divided into the at least one content block according to a text-based data structure consisting of a paragraph structure and a sentence structure, based on that the page content consists of text content;
   wherein the page content is divided into the at least one content block according to a webpage-based data structure, based on that the page content consists of webpage content; and
   wherein the at least one content block is organized as a tree structure.

2. The method according to claim 1, wherein if the page content consists of text content, the page content is divided into the at least one content block by:
   taking the text content as a root content block;
   dividing the text content according to the paragraph structure to obtain at least one second-level content block, wherein each of the at least one second-level content block corresponds to one paragraph; and dividing each of the at least one second-level content block according to the sentence structure to obtain at least one third-level content block, wherein each of the at least one third-level content block corresponds to one sentence.

3. The method according to claim 1, wherein if the page content consists of webpage content, the page content is divided into the at least one content block by:

analyzing a tree structure of the webpage content according to a source code of the webpage content; and dividing the webpage content according to the tree structure so as to obtain the at least one content block.

4. The method according to claim 1, wherein selecting the content block corresponding to the user operation comprises:

determining one content block as the selected content block if an operation region of the user operation covers all or a part of the one content block.

5. A device for selecting information, comprising:

a processor;

a touch screen; and a memory for storing instructions executable by the processor, wherein the processor is configured to perform:

receiving, through the touch screen of the device, a user operation for selecting information from page content, wherein the page content is divided into at least one content block;

selecting a content block corresponding to the user operation from the at least one content block, wherein selecting the content block corresponding to the user operation from the at least one content block comprises: determining two content blocks connected by punctuation as the selected content block based on that an operation region of the user operation covers the punctuation between the two content blocks, and determining an upper-level content block as the selected content block based on that an operation region of the user operation covers both a first lower-level content block and a last lower-level content block of the upper-level content block; and determining information of the selected content block as selected information;

wherein the page content is divided into the at least one content block according to a text-based data structure consisting of a paragraph structure and a sentence structure, based on that the page content consists of text content;

wherein the page content is divided into the at least one content block according to a webpage-based data structure, based on that the page content consists of webpage content; and wherein the at least one content block is organized as a tree structure.

6. The device according to claim 5, wherein if the page content consists of text content, the page content is divided into the at least one content block by:

taking the text content as a root content block;

dividing the text content according to the paragraph structure to obtain at least one second-level content block, wherein each of the at least one second-level content block corresponds to one paragraph; and dividing each of the at least one second-level content block according to the sentence structure to obtain at least one third-level content block, wherein each of the at least one third-level content block corresponds to one sentence.

7. The device according to claim 5, wherein if the page content consists of webpage content, the page content is divided into the at least one content block by:

analyzing a tree structure of the webpage content according to a source code of the webpage content; and dividing the webpage content according to the tree structure so as to obtain the at least one content block.

8. The device according to claim 5, wherein selecting the content block corresponding to the user operation comprises:

determining one content block as the selected content block if an operation region of the user operation covers all or a part of the one content block.

9. A non-transitory computer-readable storage medium having stored therein instructions that, when executed by a processor of a device, causes the device to perform a method for selecting information, the method comprising:

receiving, through a touch screen of the device, a user operation for selecting information from page content, wherein the page content is divided into at least one content block;

selecting a content block corresponding to the user operation from the at least one content block, wherein selecting the content block corresponding to the user operation from the at least one content block comprises: determining two content blocks connected by punctuation as the selected content block based on that an operation region of the user operation covers the punctuation between the two content blocks, and determining an upper-level content block as the selected content block based on that an operation region of the user operation covers both a first lower-level content block and a last lower-level content block of the upper-level content block; and determining information of the selected content block as selected information;

wherein the page content is divided into the at least one content block according to a text-based data structure consisting of a paragraph structure and a sentence structure, based on that the page content consists of text content;

wherein the page content is divided into the at least one content block according to a webpage-based data structure, based on that the page content consists of webpage content; and wherein the at least one content block is organized as a tree structure.

10. The method according to claim 1, further comprising:

displaying an operation menu on the touch screen of the terminal device after the selected information is determined; and performing an operation on the selected information, when an operation option corresponding to the operation in the operation menu is selected.

* * * * *